July 30, 1929.    A. KÄMPFER    1,722,427
SPRING MOUNTING FOR VEHICLES
Filed April 7, 1928
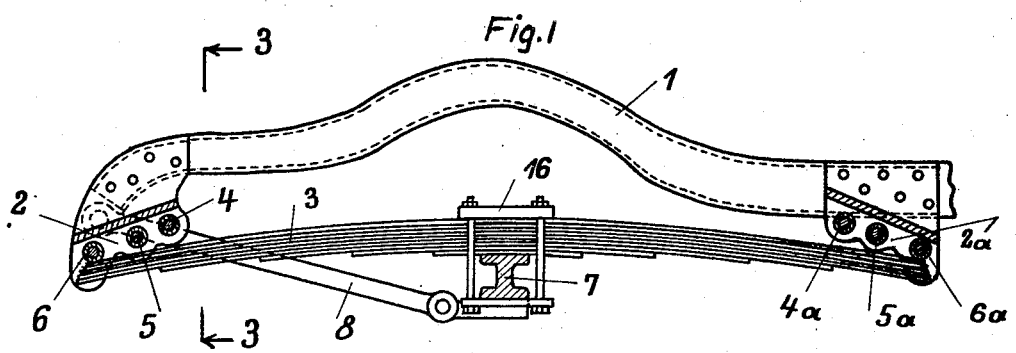
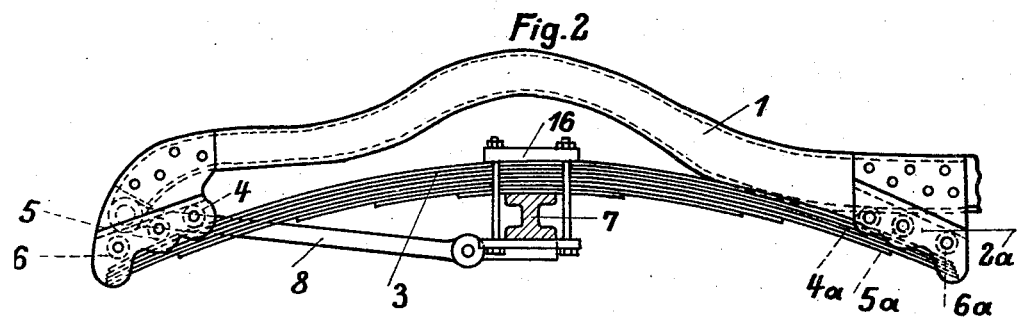
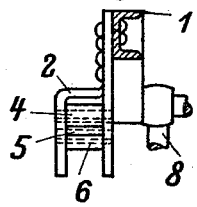
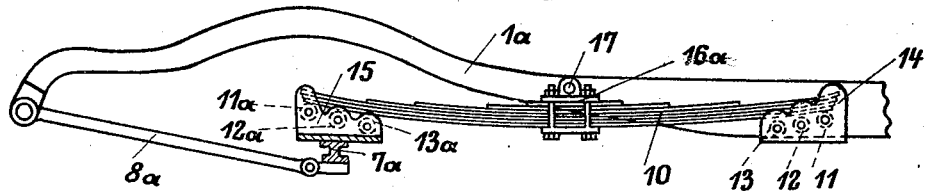
Inventor:
Adolf Kämpfer Patented July 30, 1929.

1,722,427

UNITED STATES PATENT OFFICE.

ADOLF KÄMPFER, OF BERLIN, GERMANY, ASSIGNOR OF ONE-HALF TO MAX KÜLLER, OF BERLIN-STEGLITZ, GERMANY, AND ONE-HALF TO COUNT EDUARD OPPERSDORFF, OF PARIS, FRANCE.

SPRING MOUNTING FOR VEHICLES.

Application filed April 7, 1928, Serial No. 268,352, and in Germany October 1, 1926.

My invention relates to a spring mounting by means of rollers on the frames of vehicles with variable leverage between the carrying rollers and the spring due to the flattening of the spring and consists in these supporting rollers being arranged in different horizontal planes and at such a distance from each other that they come at intervals into carrying connection with the spring mountings. The invention is based on the surprising discovery that as a result of the abrupt change of leverage in the springs due to the position of the supporting rollers oscillations of pronounced different magnitudes are produced which exercise such a dampening effect on each other that they are not transmitted to the underframe and car body. This not only brings about a carrying of the vehicle free from all oscillations and vibrations, but greatly saves the spring material from losing its resiliency prematurely and reduces friction between the various spring leaves.

Embodiments of my invention on motor-run vehicles are shown in the drawing, by way of examples.

Figs. 1 and 2 illustrate one application of my invention in side elevation with some parts in section and showing the spring in two different positions.

Fig. 3 is a section along line 3—3 of Fig. 1, the spring being not shown.

Fig. 4 shows, in a side elevation, a modified form of application.

In the example shown in Figs. 1 and 2 rollers 4, 5, 6 and $4^a$, $5^a$ and $6^a$ for spring 3 are journalled in the supports 2 and $2^a$, secured to the car frame 1, the said rollers serving as supports for the spring 3. In the middle, spring 3 is connected in a well-known manner by means of a clamping device 16 to a vehicle axle 7. In the position shown in Fig. 1 the vehicle is without load and rests by means of the rollers 6 and $6^a$ on the spring 3. When loaded the spring is pressed down and is supported first by rollers 5 and $5^a$ and then, as shown in Fig. 2, by rollers 6 and $6^a$. The axle 7 is kept in connection with the car frame 1 in a well-known manner by means of rods 8. In the example shown in Fig. 4 of a spring mounting for vehicles one end of the spring 10 projects into the case support 14 in which are mounted the rollers 11, 12, and 13 and which is secured to the frame $1^a$. The other end of the spring 10 extends into the case support 15 containing the rollers $11^a$, $12^a$, and $13^a$ and carried by the axle $7^a$. The clamp block $16^a$ which holds the spring leaves together is pivotally connected to the frame $1^a$ by means of the pin 17.

How far apart the rollers must be from each other in each particular case depends on the bearing capacity and amount of oscillation displacement of the spring. To obtain the new effect according to my invention it is only required that supporting rollers come successively or at intervals into abrupt engagement with the carrying spring whenever a variable load causes the spring to alter its shape. Springs according to my invention can in like manner be used for railway and surface cars.

While I have illustrated rollers 4, $4^a$, 5, $5^a$, 6, $6^a$ and while I preferably use rollers at these points so that as the spring flexes and the ends of the spring move longitudinally, friction will be reduced, yet I do not wish to be limited to this as these rollers constitute at each end of the spring, several separate abutments disposed in different horizontal planes and spaced from each other a distance such that the ends of the spring successively and abruptly engage the different abutments as the spring is flexed.

While I have illustrated a construction wherein the spring is carried by the axle and bears against abutments mounted upon the chassis, it will be obvious that an inversion of this will be within the spirit of my invention and that it will be also within the spirit of my invention to provide a spring which was normally bowed upward at its ends instead of downward at its ends as illustrated.

What I claim as my invention and desire to secure by Letters Patent of the United States is:—

1. The combination of a vehicle chassis, an axle, a connection between said chassis and said axle and allowing said axle to oscillate crosswise to said chassis, superposed spring leaves forming a compound leaf spring, a clamping device for said leaf spring, said clamping device being oscillatorily mounted on said vehicle chassis, at least two rollers between one end of said leaf spring and said chassis and mounted on said chassis, and at least two rollers between the other end of said leaf spring and said axle and mounted on said axle in such a manner as to be able to cooperate with the respective leaf spring end in carrying said chassis, said supporting rollers being arranged at each end of said leaf spring in markedly different horizontal planes and spaced from each other at such a distance as to cause abrupt changes in the leverage of said spring when the spring is flexed against said rollers.

2. The combination of a vehicle chassis, an axle, a connection between said chassis and said axle and allowing said axle to oscillate crosswise to said chassis, superposed spring leaves forming a leaf spring, a clamping device for said leaf spring, said clamping device being oscillatorily mounted on said vehicle chassis, at least two rollers between one end of said leaf spring and said chassis and mounted on said chassis, and at least two rollers between the other end of said leaf spring and said axle and mounted on said axle in such a manner as to be able to cooperate with said leaf spring ends in carrying said chassis, said supporting rollers each end of said leaf spring being arranged in markedly different horizontal planes and at such a distance from each other that they come abruptly and successively into cooperative connection with said spring whenever a variable load causes said spring to alter its shape to thereby cause abrupt changes in the leverage of the spring when flexed against said rollers.

3. In combination with a vehicle chassis, an axle, means allowing said axle to oscillate crosswise to said chassis, a compound leaf spring, means for clamping said leaf spring at its middle on the chassis, a plurality of abutments carried by the axle opposite one end of said spring, a plurality of abutments carried by the chassis opposite the other end of the spring, said abutments being disposed in different horizontal planes and spaced from each other a distance such as to cause abrupt changes in the leverage of the spring as the spring comes successively into engagement with said abutments when the spring flexes under a variable load.

ADOLF KÄMPFER.